Feb. 24, 1953     R. J. BONDLEY     2,629,803
TITANIUM ELECTRODE
Filed Dec. 30, 1949
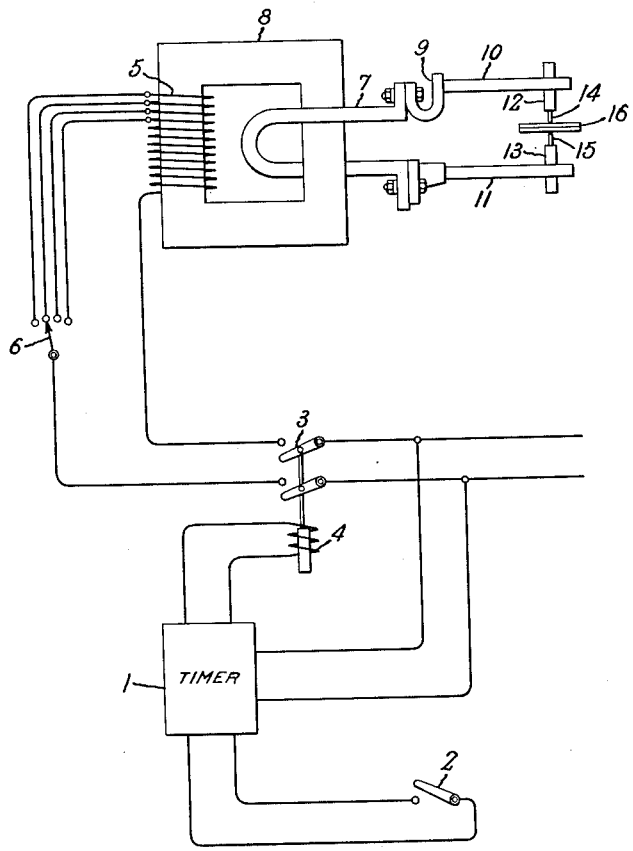
Inventor:
Ralph J. Bondley,
by Paul A. Frank
His Attorney.

Patented Feb. 24, 1953

2,629,803

UNITED STATES PATENT OFFICE 2,629,803

TITANIUM ELECTRODE

Ralph J. Bondley, Scotia, N. Y., assignor to General Electric Company, a corporation of New York Application December 30, 1949, Serial No. 136,049

1 Claim. (Cl. 219—4)

This invention relates to electric resistance brazing and, more particularly, to an improved electrode for use in brazing apparatus.

Brazing is a metal joining process wherein the parts are united by solidified filler material located therebetween and forming a bond therewith. The filler material may be placed in solid form between the parts and then fused and allowed to solidify, or fused by contact with the heated parts or otherwise, and introduced into the joint by gravity or capillary attraction and then allowed to solidify. In fact, brazing is nothing more than soldering with metals and alloys having higher melting points than the usual lead-tin solders. For brazing, the filler or joining material will most generally have a melting point higher than 1000° F., but of course lower than that of the metal or alloy to be joined. Electric resistance brazing is a particular type of brazing in which the required heat is generated by the passage of electric current through the parts being brazed and through electrodes in engagement therewith. Electric resistance brazing may be divided into that class wherein heat is developed principally by the resistance of the work itself or into a second class wherein the heat is generated principally in the electrode or electrodes in engagement with the work, the heat being transferred for the most part by conduction from the electrode or electrodes to the work. This invention relates particularly to the latter category of brazing.

In electric brazing, the parts are held in assembled relationship and pressed together to eliminate all but a small amount of filler material so as to secure joints of superior strength. Consequently, the electrodes used must be capable of exerting the desired pressures. Also, for many kinds of work, especially those of low electric resistance, it is important that the electrodes have a very high resistance, since generated heat is a product of the current squared times the resistance of the electrode.

Because of these conditions, it is desirable to employ an electrode that can withstand high heat and pressure. Carbon which has been used in resistance brazing as an electrode material does not meet these requirements, since carbon electrodes will often crumble and fracture under pressures required for the brazing operation. Furthermore, for most brazing operations, these carbon electrodes must operate at incandescent temperatures at which they sublime and waste away, thus becoming depleted or loose in their holders with which they then form arcing contacts productive of conditions which destroy these holders.

It is an object of this invention to provide an improved electrode for use in electric brazing apparatus.

It is a further object of this invention to provide a high pressure exerting high resistance electrode having improved characteristics.

It is a still further object of this invention to provide a high resistance electrode which makes feasible lighter brazing equipment.

Broadly, this invention comprises the use of electrodes or electrode tips of titanium metal for electric resistance brazing.

Further objects and advantages of this invention will become apparent and the invention will be more clearly understood from the following description referring to the accompanying drawing, and the features of novelty which characterize this invention will be pointed out with particularity in the claim annexed to and forming a part of this specification.

While, in the following paragraphs, electrodes having work engaging tips of titanium are described in use with stationary brazing apparatus, it is to be understood that stationary apparatus has merely been selected as an example more clearly to illustrate the operation of brazing equipment embodying my invention, and that it is by no means intended to act as a limitation on the applications of my invention. As a matter of fact, such electrodes are more important to portable apparatus than they are to stationary apparatus, since the use of these electrodes permits the use of electric current conductors of smaller cross sectional area and less weight because less current is required to produce the same heat at the work than if other lower resistivity electrodes were used.

In the drawing, the single figure illustrates the fundamental electrical components of a brazing apparatus.

Referring to the drawing, a timer 1, having an initiating switch 2, controls a switching device 3, which connects the primary winding 5 of the brazing transformer 8 to a source of supply voltage (not shown). The timer controls the period of energization of the operating winding 4 of switching device 3 and may be set to determine different timing periods for different brazing operations. A heat regulating switch 6 controls the amount of primary winding current and the flux generated by it in transformer 8. The voltage induced in the secondary winding 7 of transformer 8 by primary winding 5 causes current to flow through the secondary circuit comprising the secondary winding 7, a flexible band 9, conductors 10, 11, electrodes 12, 13, titanium electrode tips 14, 15 and the material to be brazed 16. Titanium electrode tips may be secured to the electrodes by tapping the electrodes 12, 13 and screwing a threaded tip 14, 15 into it, or by any other means. It would also not constitute any departure from this invention if the whole electrode were made of titanium metal.

In the operation of this invention, current passes through the circuit, as has been described in the above paragraph, to the titanium tips 14, 15. The current passes from one electrode, for example, 14, through the work 16, to a second electrode 15, thereby generating heat which is a product of the current squared times the resistance of the titanium electrode and also heat which is a product of the resistance of the work times the current squared. The heat in the electrode passes, for the most part, by conduction into the work and supplements that heat which is generated in the work itself by its own resistance. This heat melts the filler material which has been placed between the work parts. Upon interruption of current flow, the heating effect is terminated and the filler material solidifies, forming the desired brazed joint.

It is to be noted that when the titanium electrodes are heated, an oxide coating forms on their exposed surfaces and this acts as a protective coating that insures against deterioration of the titanium metal as the result of any heat generated in it. This protective oxide coating greatly increases the life of titanium electrodes and reduces considerably the frequency with which the electrodes have to be replaced.

The peculiar physical properties of titanium makes it a unique metal for electrode use in brazing. Primarily, it has a high resistivity as compared to copper, which is usually used for leads. Consequently, the use of titanium provides for a brazing current which produces a satisfactory heat at the electrode tip without generating a high heat in the leads or conductors used in carrying current from the secondary of the brazing transformer to the electrode. For a pre-fixed operating temperature, if an electrode of lower resistivity than titanium is used, the heat in the lead to the electrode increases as the resistivity of the electrode decreases.

It is also important in brazing that an electrode be used that has a relatively high melting point, since heat radiation properties of metal are proportionate to the fourth power of the temperature that is used in the brazing process. Consequently, if a high melting point electrode is used, it radiates heat to the work to be brazed in the order of the fourth power of its operating temperature, as compared to the fourth power of the operating temperature of another electrode having a different melting point. To bring out this point more clearly, while Nichrome has a higher resistivity than titanium, its melting point is considerably lower. Consequently, a higher working temperature can be used with titanium than with Nichrome and the rate of heat radiation is proportional to the fourth power of their operating temperatures.

In the past, tungsten, molybdenum and stainless steel have also been considered as electrodes for electric brazing, but their resistivity is much lower than that of titanium and, in addition, while the operating temperature of tungsten and molybdenum is higher than that of titanium, both tungsten and molybdenum form oxides at very low temperatures which tend to deteriorate the electrodes.

Tests have proven that titanium has made a much improved electrode for use in electric brazing. It has a long life, good heat transfer properties, a high operating temperature, and it can withstand high working pressures; therefore, there is not the problem of frequently replacing the electrodes, as there is in the use of carbon.

Modifications of this invention will occur to those skilled in the art and it is desired to be understood, therefore, that this invention is not to be limited to the particular embodiment disclosed, but that the appended claim is meant to cover all the modifications which are within the spirit and scope of this invention.

What I claim as new and desire to secure by Letters Patent of the United States is:

Electric resistance brazing apparatus comprising a current conducting pressure exerting electrode having a work engaging face of pure titanium whereby at brazing temperatures an oxide coating is formed thereon which not only prevents it from sticking to the work, or the solder or flux used in brazing, but also prevents it from wasting away due to the action of brazing fluxes or oxidation by the surrounding atmosphere, means for bringing the face of said electrode into and out of engagement with a work part, and means for supplying electric current to the work part through said electrode.

RALPH J. BONDLEY.

REFERENCES CITED

The following references are of record in the file of this patent:

UNITED STATES PATENTS

| Number | Name | Date |
|---|---|---|
| 853,351 | Fulton | May 14, 1907 |
| 1,026,456 | Rambaud | May 14, 1912 |
| 1,176,614 | Stanley | Mar. 21, 1916 |
| 1,471,326 | Copland | Oct. 23, 1923 |
| 2,127,596 | Hensel et al. | Aug. 23, 1938 |
| 2,160,659 | Hensel | May 30, 1939 |
| 2,282,186 | Henninger | May 5, 1942 |

FOREIGN PATENTS

| Number | Country | Date |
|---|---|---|
| 685,857 | Germany | Dec. 28, 1939 |

OTHER REFERENCES

Standard Handbook for Electrical Engineers, by McGraw-Hill, 1941 ed., page 314.

General Electric Diary, 1946, page 46.